United States Patent [19]
Slepekis

[11] Patent Number: 5,735,657
[45] Date of Patent: Apr. 7, 1998

[54] ORBITAL THREADED FASTENER ASSEMBLY

[75] Inventor: Patrick J. Slepekis, Sturgeon Bay, Wis.

[73] Assignee: Amkus, Inc.

[21] Appl. No.: 694,656

[22] Filed: Aug. 5, 1996

[51] Int. Cl.⁶ ................. F16B 35/02; F16B 37/08
[52] U.S. Cl. ............... 411/383; 411/178; 411/432
[58] Field of Search .................... 411/178, 383, 411/384, 385, 354, 427, 432

[56] References Cited

U.S. PATENT DOCUMENTS

| | | | |
|---|---|---|---|
| 4,655,479 | 4/1987 | Farr, Jr. | 411/178 X |
| 4,971,497 | 11/1990 | Stoffer et al. | 411/178 X |
| 4,975,014 | 12/1990 | Rufin et al. | 411/385 X |
| 5,066,180 | 11/1991 | Lang et al. | 411/178 X |
| 5,090,857 | 2/1992 | Dunn | 411/354 X |

*Primary Examiner*—Neill R. Wilson

*Attorney, Agent, or Firm*—Seyfarth, Shaw, Fairweather & Geraldson

[57] ABSTRACT

An orbital threaded fastener assembly includes an orbital nut or bolt and a split thread ring. Each of the nut or bolt and the thread ring has formed thereon a series of alternating, coaxial, circumferential grooves and teeth sized to mateably engage each other. These grooves and teeth can be formed on either the internal surface of the nut and the external surface of the ring or the external surface of the bolt and the internal surface of the ring. In use, the diameter of the ring is resiliently expanded or contracted to permit it to be disposed at a desired axial position along the nut or bolt to engage each other, thereby preventing relative axial movement of the parts while accomodating relative rotational movement thereof. The surface of the ring opposite that carrying the grooves and teeth is threaded to permit threaded coupling to an associated threaded component. The nut or bolt may also be threaded on the surface opposite the one which engages the ring to permit threaded coupling to another component.

14 Claims, 2 Drawing Sheets

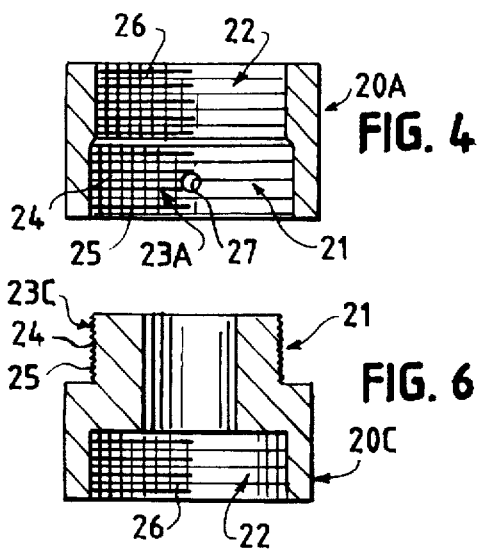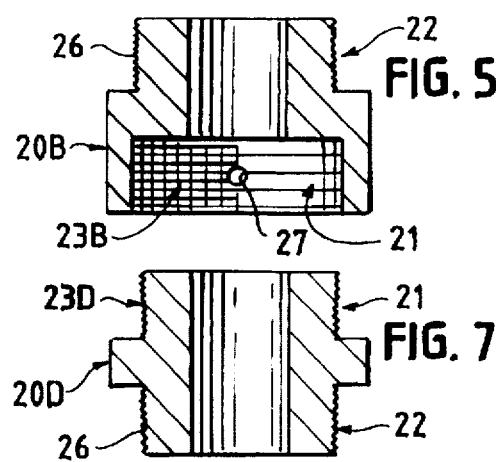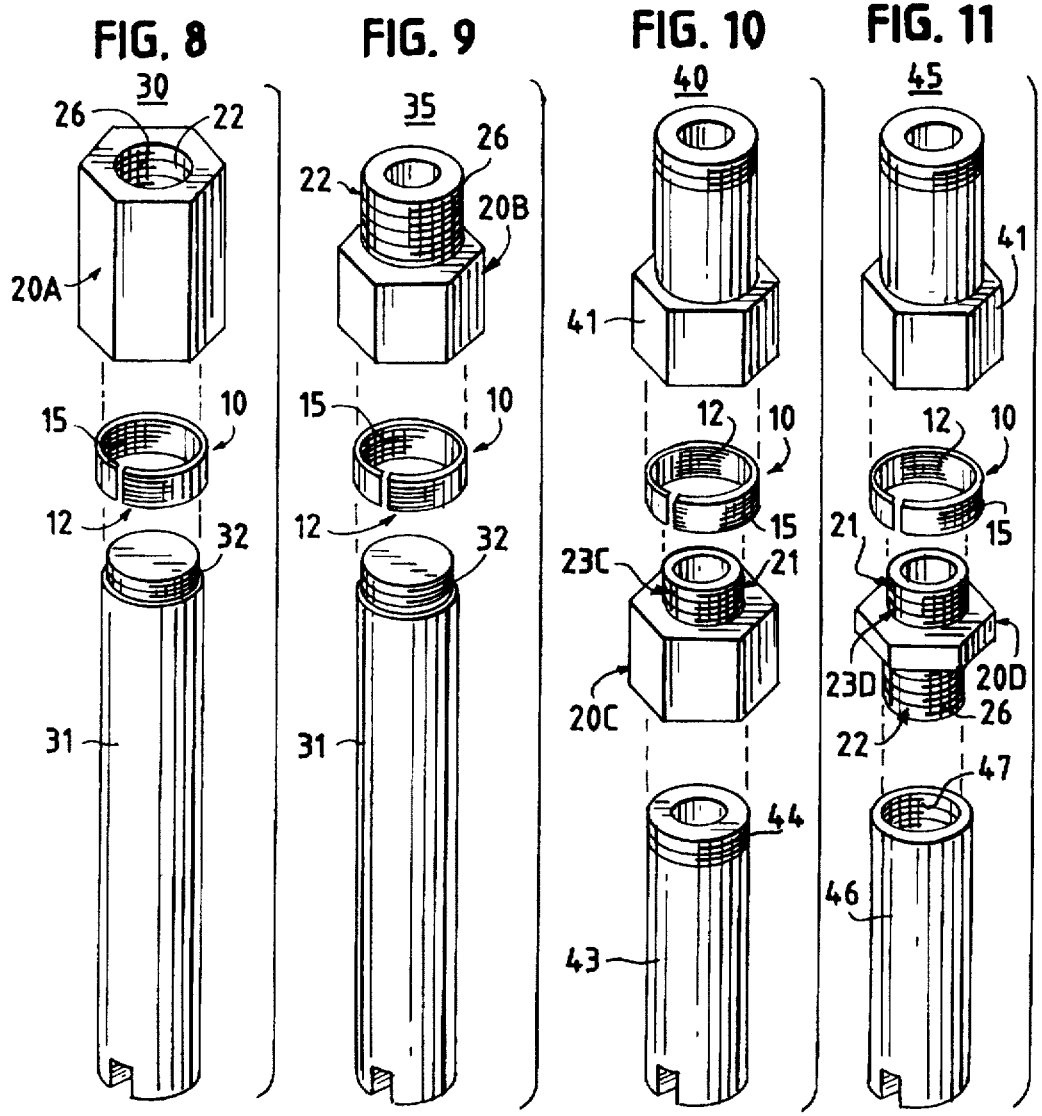

ORBITAL THREADED FASTENER ASSEMBLY

The present invention relates to a threaded fastener assembly. More particularly, the present invention relates to a threaded fastener assembly wherein the threaded fastener can achieve a specific rotational head orientation when rotated to a specific axial position.

BACKGROUND OF THE INVENTION

Many types of threaded fasteners are known in the prior art, including nuts, bolts and screws. An inherent characteristic of such fasteners is that a change in the rotational orientation of the threaded fastener results in a change in the fastener's axial position. Generally, when such fasteners are machine-made, the starting point for the threads is randomly oriented relative to the fastener's rotational orientation. Because the relationship between the starting point of the threads and the fastener's rotational orientation is random, rotating the fastener to a specific axial position will result in an unpredictable rotational fastener orientation. In some applications, a specific and/or uniform fastener rotational orientation at a specific axial position is required or useful. In such applications, traditional threaded fasteners and the machining techniques for producing them are unacceptable.

One solution to the above-stated problem known in the prior art is to use each fastener as an index for its mating component or components. First, threads are machined onto the fastener. The fastener threads are then used as an index for machining operations on the mating component or components to which it will be threadedly engaged. Such a process produces a threaded fastener mating assembly which will have a specific fastener rotational orientation at a specific axial position. However, each threaded fastener mating assembly, comprising a fastener component and a mating component or component, is unique. Therefore, if one component of any fastener mating assembly produced by this process is damaged or misplaced, the entire assembly is rendered useless as a solution to the above-stated problem and must be discarded. In addition, because each fastener mating assembly must be manufactured separately, the manufacturing process is not subject to the efficiencies of traditional threaded fastener mass production. Furthermore, the fastener mating assembly components are not interchangeable. They are, accordingly, more expensive and onerous to use and maintain.

SUMMARY OF THE INVENTION

It is, therefore, an object of the present invention to provide a threaded fastener assembly wherein the fastener will have a specific rotational orientation at a specific axial position and in which the fastener and mating components can be machine-made by traditional methods so that parts can be used interchangeably.

It is also an object of the present invention to provide such a threaded fastener assembly in which there are relatively few components, so that use and maintenance of the assembly is relatively simple and so that the assembly is relatively inexpensive.

These objects and others are achieved according to the present invention by an orbital threaded fastener assembly in which a thread ring allows the assembly to be rotated to a specific axial position on the threaded fastener component while not fixing the rotational orientation of the other component, the orbital nut or orbital bolt. The orbital nut or orbital bolt can be rotated to any desired rotational head orientation without altering the axial position of the assembly.

Further objects, features, and advantages of the invention will become evident from a consideration of the following detailed description, when taken in conjunction with the accompanying drawings and appended claims.

BRIEF DESCRIPTION OF THE DRAWINGS

To facilitate an understanding of the invention, preferred embodiments thereof are illustrated in the accompanying drawings, from an inspection of which, when considered in connection with the following description, its construction, its operation, and many of its advantages should be readily understood and appreciated.

FIG. 4 is a sectional view of one embodiment of the orbital nut of the orbital threaded fastener assembly of the invention;

FIG. 5 is a sectional view of another embodiment of the orbital nut;

FIG. 6 is a sectional view of one embodiment of the orbital bolt of the orbital threaded fastener assembly of the invention;

FIG. 7 is a sectional view of another embodiment of the orbital bolt; FIG. 8 is an exploded, perspective view of an assembly including the nut of FIG. 4; FIG. 9 an exploded, perspective view of an assembly including the nut of FIG. 5; FIG. 10 is an exploded, perspective view of an assembly including the bolt of FIG. 6; and FIG. 11 is an exploded, perspective view of an assembly including the bolt of FIG. 7.

DETAILED DESCRIPTION OF THE PREFERRED EMBODIMENTS

Figure 1:
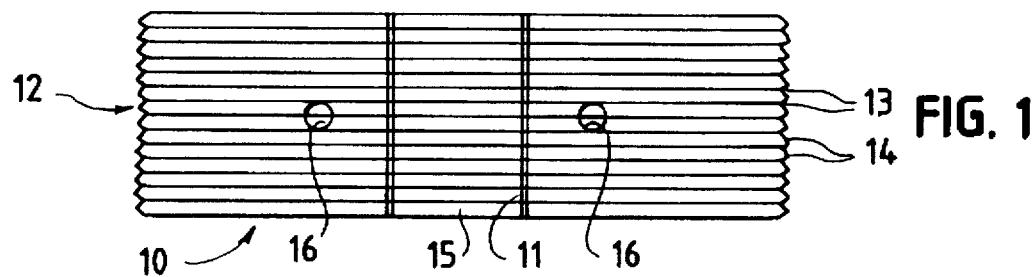
FIG. 1 is a side elevational view of the thread ring of the orbital threaded fastener assembly of the invention.
Figure 2:
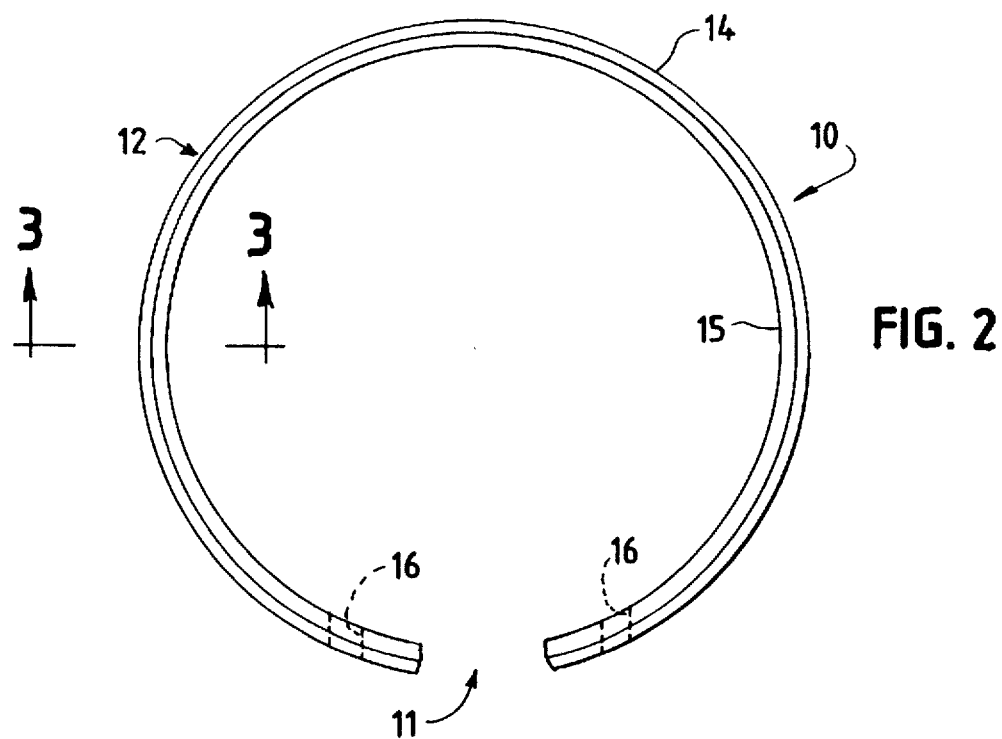
FIG. 2 is a bottom plan view of the thread ring of FIG. 1.
Figure 3:
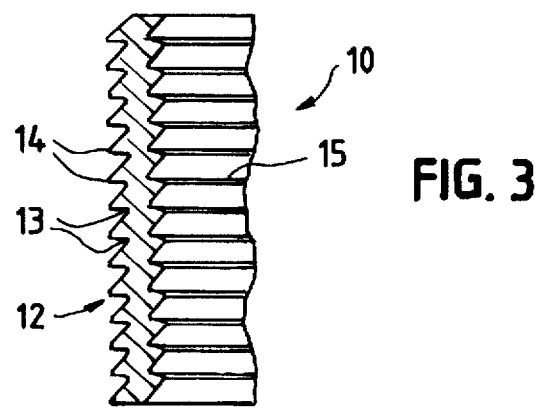
FIG. 3 is an enlarged, fragmentary, sectional view of the thread ring taken along the line 3—3 in FIG. 2

FIGS. 1 through 11 illustrate an orbital threaded fastener assembly as described and claimed in this application. The orbital threaded fastener assembly comprises two components: a "thread ring" 10, as shown in FIGS. 1, 2, and 3, and an "orbital nut" 20A or 20B or "orbital bolt" 20C or 20D, as shown in FIGS. 4, 5, 6, and 7. In a preferred embodiment of the orbital threaded fastener assembly, the assembly can be fastened to one or more threaded components, such as threaded component 31 in FIGS. 8 and 9 or threaded components 41, 43 and 46 in FIGS. 10 and 11.

The thread ring 10, as shown in FIGS. 1, 2, and 3, is in the nature of a split ring and forms a rough cylinder except for a slot 11 that runs the axial length of the thread ring. The thread ring 10 has sufficient flexibility and resilience that its diameter can be temporarily expanded or contracted. On one of the surfaces (either the internal surface or the external surface) of the thread ring 10, there is a series 12 of alternating, coaxial, circumferential grooves 13 and teeth 14 (shown on the external surface in FIGS. 1–3, 8 and 9 and on the internal surface in FIGS. 10 and 11). In a preferred embodiment of the orbital threaded fastener assembly, the coaxial grooves 13 and teeth 14 are machined into the thread ring 10 so that the grooves and teeth conform with standard thread specifications. Also, in a preferred embodiment of the orbital threaded fastener assembly, the coaxial grooves 13 and teeth 14 are cut with a buttress thread profile as shown in FIG. 3. On the other surface of the thread ring (either the external surface or the internal surface), there is a helical screw thread 15. In a preferred embodiment of the orbital threaded fastener assembly, the screw thread 15 is cut with a standard threading tool to conform with standard thread specifications.

In a preferred embodiment of the orbital threaded fastener assembly, the slot 11 is created by machining away a narrow area of the cylindrical thread ring. In a preferred embodiment of the orbital threaded fastener assembly, the thread ring also has expansion holes 16 formed therethrough on both sides of the slot. The thread ring can be constructed of a wide variety of materials, ranging from high-strength tempered metals, such as aluminum and steel, to plastics. The expansion holes 16 can be used to exert a force on the thread ring sufficient to expand or contract the width of the slot 11 and, thereby, the diameter of the thread ring 10. In a preferred embodiment of the orbital threaded fastener assembly, the expansion holes 16 are oriented and sized such that a snap-ring pliers can be used to expand the slot of the thread ring by spreading the expansion holes apart or to contract the slot of the thread ring by pressing the expansion holes together. If there are no expansion holes in the thread ring 10, force can be applied by some other means to either the external surface or the internal surface of the thread ring 10 to contract or expand the width of the slot 11.

Referring to FIGS. 4–7, there are illustrated four embodiments of an orbital nut or orbital bolt in accordance with the present invention, the specific embodiments of FIGS. 4–7 being respectively designated by the numbers 20A–20D. Each of the nuts 20A or 20B or bolts 20C or 20D has a cylindrical ring-mating region 21 and a cylindrical fastener-mating region 22. In the ring-mating region 21, the orbital nut has an internal surface and the orbital bolt has an external surface on which is formed a series of alternating, coaxial, circumferential grooves 24 and teeth 25, the specific embodiments of the series shown in FIGS. 4–7 being respectively designated by the numerals 23A–23D. The grooves 24 and teeth 25 conform to the same thread specifications as the grooves 13 and teeth 14 of the thread ring 10. The diameter of the orbital nut or orbital bolt surface carrying the grooves 24 and teeth 25 is such that the grooves 24 and teeth 25 will respectively engage the teeth 14 and the grooves 13 of the thread ring 10 when the thread ring 10 is in its at-rest condition, i.e., teeth 14 will respectively engage in grooves 24 and teeth 25 will respectively engage in grooves 13. When the thread ring 10 is thus engaged with the ring-mating region 21 of the orbital nut or orbital bolt, this engagement inhibits relative axial movement of the parts while accommodating relative rotational movement thereof. The fastener-mating region 22 of the orbital nut or orbital bolt has a surface (either internal or external) with a helical screw thread 26 formed therein.

The orbital nut 20A of FIG. 4 has both the series 23A of grooves and teeth and the thread 26 on internal surfaces. The orbital nut 20B of FIG. 5 has the series 23B of grooves and teeth on an internal surface and the thread 26 on an external surface. The orbital bolt 20C of FIG. 6 has the series 23C of grooves and teeth on an external surface and the thread 26 on an internal surface. The orbital bolt 20D of FIG. 7 has both the series 23D of grooves and teeth and the thread 26 on external surfaces. In the orbital nuts 20A and 20B of FIGS. 4 and 5, wherein the series 23A and 23B of grooves and teeth are on an internal surface, there is preferably provided an access hole 27 formed through the orbital nut in the ring-mating region 21 thereof to allow a tool, such as a dowel, to be inserted through the orbital nut to prevent rotation of the thread ring 10 relative to the orbital nut. It will be appreciated that the orbital bolts 20C and 20D of FIGS. 6 and 7, which have series 23C and 23D of coaxial grooves and teeth on external surfaces, are adapted for use with a thread ring 10, which has the series 12 of coaxial grooves and teeth formed on the internal surface thereof. The thread 26 may be cut with a standard threading tool to conform with standard thread specifications. By means of the thread 26, the orbital nut or orbital bolt 20 can be threadedly coupled to an associated component.

For the orbital threaded fastener assembly to be used, the diameter of the thread ring 10 must first be altered temporarily. If the series 12 of coaxial grooves and teeth on the thread ring 10 is on the outside surface, the diameter of the thread ring 10 must be decreased by closing the slot 11 to some degree. The thread ring 10 is then placed in the ring-mating region 21 of an orbital nut having grooves and teeth 24, 25 on an internal surface, such as nut 20A or 20B of FIG. 4 or 5, to an appropriate axial position. Either while the diameter of the thread ring 10 is temporarily altered or afterward, the rotational position of the thread ring relative to the orbital nut is adjusted to a desired position.

Referring to FIG. 8, there is shown an assembly 30 illustrating application of the orbital threaded fastener assembly of the present invention incorporating the orbital nut 20A of FIG. 4, wherein the thread ring 10 is threadedly coupled to an associated component 31 having an external thread 32 thereon. Once the thread ring 10 is axially positioned in the orbital nut 20A, it can be rotated so that an instrument can be inserted through the access hole 27 and into the slot 11 of the thread ring 10 to prevent further rotation of the thread ring 10. The thread ring 10 is then threadedly coupled to the associated component 31 to a specific axial position. Finally, the instrument inserted in the access hole 27 is withdrawn and the orbital threaded fastener assembly provides a threaded fastener element fastened at a specific rotational orientation and a specific axial position on the threaded component 31. FIG. 9 illustrates a similar assembly 35, wherein the orbital threaded fastener assembly includes the orbital nut 20B of FIG. 5.

Similarly, if the series 12 of coaxial grooves and teeth on the thread ring 10 are on the inside surface, the diameter of the thread ring 10 must be increased by additionally opening the slot 11 to some degree. The thread ring 10 is then placed on the ring-mating region 21 of an orbital bolt having grooves and teeth 24, 25 on an external surface, such as bolt 20C or 20D of FIG. 6 or 7, to an appropriate axial position, and the rotational position of the thread ring 10 is then adjusted as described above. FIG. 10 shows an assembly 40 illustrating application of the orbital threaded fastener assembly of the present invention incorporating the orbital bolt 20C of FIG. 6. In this case, the thread ring 10 is threadedly coupled to an associated component 41 having an internal thread (not shown). The orbital threaded fastener assembly thus provides a threaded fastener element at a specific rotational head orientation fastened at a specific axial position to the threaded component 41. The thread 26 of the orbital bolt 20C permits coupling to another component, such as the component 43 having an external thread 44. FIG. 11 illustrates a similar assembly 45, except that in this case the orbital bolt is the bolt 20D of FIG. 7, which is threadedly coupled to an associated component 46 having an internal thread 47.

The invention has been described above in an illustrative manner and it is to be understood that terminology which has been used is intended to be in the nature of description rather than of limitation. Obviously many modifications and variations of the present invention are possible in light of the above teachings. It is therefore to be understood that within the scope of the appended claims, the invention may be practiced otherwise than as specifically described.

What is claimed is:

1. An orbital nut assembly comprising:

a thread ring of a generally cylindrical shape having internal and external surfaces and a cylindrical axis and a slot therein along the axial length thereof, said thread ring being sufficiently flexible and resilient that the diameter of said thread ring can be temporarily altered by altering the width of said slot, said thread ring having a first series of alternating, circumferential, coaxial grooves and teeth on the external surface thereof, said thread ring having a thread formed on the internal surface thereof; and an orbital nut having a second series of alternating, coaxial, circumferential grooves and teeth on the internal surface thereof dimensioned and positioned to engage respectively with the teeth and grooves of the first series on the thread ring such that the relative axial positions of the thread ring and the orbital nut cannot change.

2. The orbital nut assembly of claim 1, and further comprising a component threadedly coupled to the thread of said thread ring.

3. The orbital nut assembly of claim 1, wherein said nut has a thread formed thereon.

4. The orbital nut assembly of claim 3, and further comprising a first component threadedly coupled to the thread of said thread ring, and a second component threadedly coupled to the thread of said orbital nut.

5. The orbital nut assembly of claim 3, wherein the orbital nut is internally threaded.

6. The orbital nut assembly of claim 3, wherein the orbital nut is externally threaded.

7. The orbital nut assembly of claim 1, wherein the thread ring has expansion holes therethrough on both sides of the slot.

8. The orbital nut assembly of claim 1, wherein the orbital nut has an access hole therethrough at said second series of coaxial grooves and teeth.

9. An orbital bolt assembly comprising:

a thread ring of a generally cylindrical shape having internal and external surfaces and a cylindrical axis and a slot therein along the axial length thereof, said thread ring being sufficiently flexible and resilient that the diameter of said thread ring can be temporarily altered by altering the width of said slot, said thread ring having a first series of alternating, circumferential, coaxial grooves and teeth on the internal surface thereof, said thread ring having a thread formed on the external surface thereof; and an orbital bolt having a second series of alternating, coaxial, circumferential grooves and teeth on the external surface thereof dimensioned and positioned to engage respectively with the teeth and grooves of the first series on the thread ring such that the relative axial positions of the thread ring and the orbital bolt cannot change.

10. The orbital bolt assembly of claim 9, and further comprising a component threadably coupled to the thread of said thread ring.

11. The orbital bolt assembly of claim 9, wherein the thread ring has expansion holes therethrough on both sides of the slot.

12. The orbital bolt assembly of claim 9, wherein said bolt has a thread formed thereon.

13. The orbital bolt assembly of claim 12, wherein said orbital bolt is internally threaded.

14. The orbital bolt assembly of claim 12, wherein said orbital bolt is externally threaded.

* * * * *